Sept. 1, 1925.

A. C. GALDI ET AL 1,552,136

UNAUTHORIZED USE PREVENTER

Filed May 20, 1921  2 Sheets-Sheet 1

ALFRED C. GALDI.
ARMAND GALDI.
Inventors:
by Romeyn A. Spare
Atty.

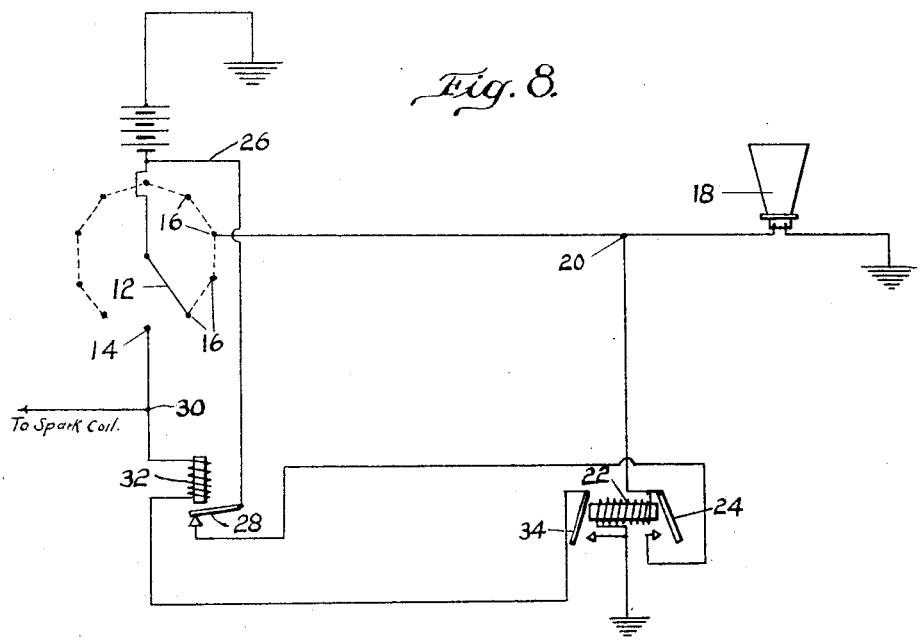
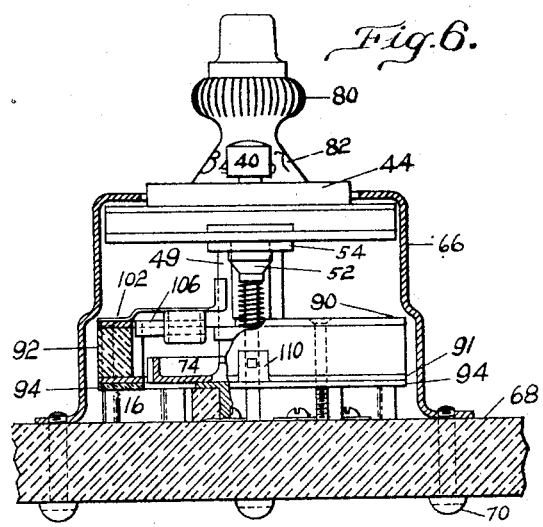
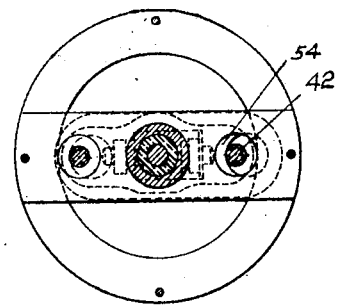

Patented Sept. 1, 1925.

1,552,136

UNITED STATES PATENT OFFICE.

ALFRED C. GALDI AND ARMAND GALDI, OF SOMERVILLE, MASSACHUSETTS.

UNAUTHORIZED-USE PREVENTER.

Application filed May 20, 1921. Serial No. 471,225.

*To all whom it may concern:*

Be it known that we, ALFRED C. GALDI and ARMAND GALDI, citizens of the United States, residing at Somerville, in the county of Middlesex and State of Massachusetts, have invented certain Improvements in Unauthorized-Use Preventers, of which the following is a full, clear, and exact description.

This invention relates to unauthorized use preventers and is herein shown as embodied in an apparatus especially intended for use in the ignition circuit of automobiles although it should be understood that it is not limited to such use.

To prevent theft of automobiles, various expedients have been resorted to. Locks have been applied to the wheels, to the steering gear and various other parts of the car but their presence is obvious and they can usually be removed since one versed in such matters can often work on them for a long time without interruption.

The object of our invention is to provide an improved theft preventer preferably for use in the ignition system. A characteristic of our improvement is that any attempt to tamper with the ignition is immediately made apparent by the operation of a signal, preferably audible, which quickly renders further experiments embarrassing and dangerous to the meddler. In the illustrated construction, a switch member is interposed between the usual battery and, either the horn with which the machine is provided, or a special gong; it is mounted to complete the ignition circuit when set in accordance with a novel combination mechanism, familiar only to the owner. The switch member is preferably slidably mounted on a rotatable head by which it can be turned to cause registration with different contact members some of which are connected to the alarm circuit. As a further feature, a rotatable plate also connected to the alarm, is normally interposed in the path of movement of the switch member so that the least actuation of the latter starts the signal. As shown, this plate is provided with an aperture, which, when set in the proper position, allows passage of the switch member. Still another preferred feature resides in the provision of means for continuing the actuation of the alarm even if the switch is withdrawn.

These and other features and advantages of the invention will be apparent from a consideration of the following description and drawings in which—

Figure 1:
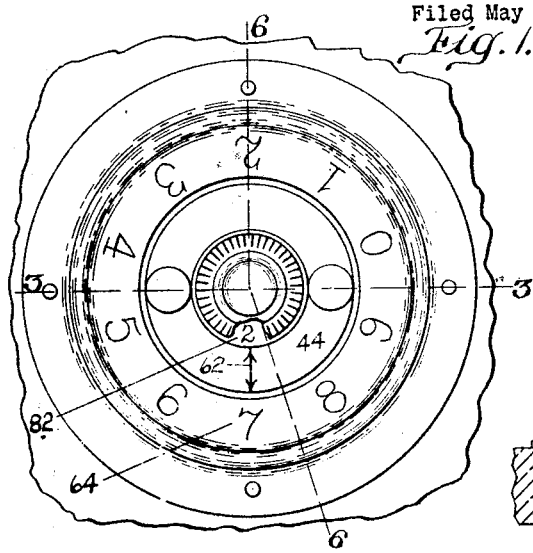
Figure 2:
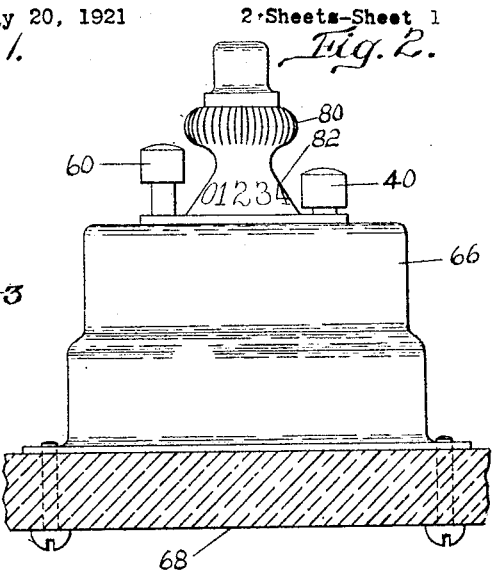

Fig. 1 is a top plan view and Fig. 2 a front elevation.

Figure 3:
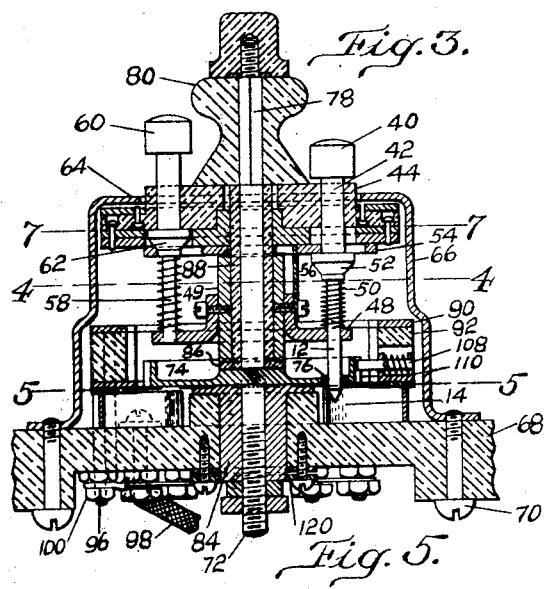
Figure 4:
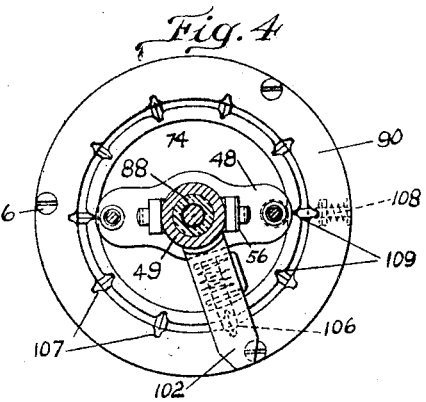

Figs. 3 and 4 sections on the lines 3—3 and 4—4 of Figs. 1 and 3 respectively.

Figure 5:
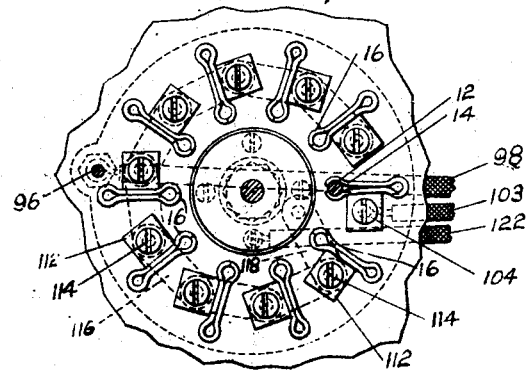

Fig. 5 a section on line 5—5 of Fig. 3.

Figs. 6 and 7 sections on the lines 6—6 and 7—7 of Figs. 1 and 3.

Fig. 8 a diagram showing the electrical connections.

Our apparatus is more especially intended for use in the ignition system of automobiles between the usual battery and the distributor or spark coil, being mounted preferably on the instrument board. Referring first to the diagram in Fig. 8, current from the battery leads to a switch member 12 which, when operated in accordance with a predetermined combination, is adapted to make contact with a contact point 14 which leads to the spark coil. Under these conditions the ignition system will operate in the usual way.

If, however, an unauthorized person, not aware of the combination, causes the switch member to make contact with any of a series of contact points represented at 16, the current is directed to a horn, bell or other alarm signal represented at 18 as being grounded on the frame. The construction is such that when this incorrect connection is once established, it cannot be interrupted except by a person knowing the combination. This effect is produced because the current can divide at 20 to pass through a magnet coil at 22 which causes the normally open spring contact member 24 to be closed. Thus, even if the switch member 12 be retracted from one of the points 16, the current can continue to flow from the battery through the wires 26, the normally closed connection 28, the contact member 24 and to the alarm. The continued sounding of the latter soon apprises the bystanders of an unusual situation and directs an embarrassing amount of attention to the rogue, resulting in his capture or at any rate in saving the car.

As a further feature, it is desirable that the owner be enabled to stop the alarm if started through accidental or other legitimate movement of the switch member. Under these conditions, he can promptly set the switch member in its proper position against the contact point 14, this resulting in a division of the current at 30 and actuation of the relay 32 to open the normally closed contact spring 28 to silence the alarm. Current is permitted to divide at 30 and flow through the relay 32 by reason of the previous closing of a contact spring 34 actuated by the previously energized magnet core 22 previously referred to.

The theory of operation having been plainly set forth, we will now proceed to describe the mechanism by which the above mentioned connections are established. See Fig. 3. The switch 12 is preferably in the form of a vertically slidable spindle actuated in one direction by a push button 40 and having an enlarged cylindrical portion 42 guided in a rotatable head 44. The spindle is raised, when permitted, from contact with the contact spring 14, by a coil spring 50 interposed between a bracket 48 secured to a bushing 49 carried by the rotatable head and the lower end of a conical cam member 52 on the spindle. To lock the spindle in its depressed, operative position, a plate 54 is mounted for sliding movement on the head and is provided with openings loosely surrounding the enlarged portion 42 of the spindle, said plate being moved to a locking position above the cam by a leaf spring 56 secured to the bracket 48. For releasing the switch member or spindle 12, a second and shorter switch member, or spindle 58 is similarly mounted diametrically opposite the first spindle and has a similar push button 60 and a similar conical cam 62 to slide the plate 54 in the opposite direction.

Since there is only one contact spring 14 which will establish communication between the battery and the ignition system, it is necessary to rotate the head to carry the switch member or spindle 12 to this predetermined point. Consequently, we provide the head with an index line 62 for cooperation with a dial 64 on a casing 66 which surrounds the mechanism and is attached to an insulated base 68 as by screws 70.

To make the correct contact more difficult to establish by an uninitiated person, a second and preferably rotatable member is mounted for cooperation with the rotatable head and its spindle. As shown, a vertical central spindle 72 is formed with an enlarged cup shaped portion 74 having at one point in its base an insulated opening 76 for passage of the switch member or spindle 12. The member 74 rotates with its spindle which is squared at its upper end at 78 for reception of a milled turning knob 80. To enable the member 74 to be properly oriented, the knob 80 is provided with a dial 82 for cooperation with the other end of the index line 62 on the rotatable head. The member 74 is supported for rotation by a flanged bushing 84 in the base, and the spindle 72 is secured loosely in the bushing by a nut and lock nut at its lower end. To prevent any electric contact between the outer and inner rotatable members, an insulating bushing 88 and an insulating washer 86 are interposed between them. The turning knob 80 or the upper part of the rotatable head 44, or both, may also be made of insulating material. Encircling the bushing 49 of the rotatable head is a fixed member formed of upper and lower spaced rings 90 and 91 separated by an insulating ring 92. The contact ring 90 is connected by a binding screw 96 and nut 100, Figs. 3 and 4, with a wire 98 leading in from the battery. Current can pass from the ring 90 to the bushing 49 through a brush or plate 102, Figs. 4 and 6, which continually bears on the ring and is attached in any suitable way to the bushing. When the switch member or spindle 12 is depressed against the contact spring 14, the current can pass to the ignition system through wires 103 attached to a binding screw 104 which passes through the base 10 and is connected to a lug on the contact spring 14.

To aid in adjusting the switch member or spindle 12 and the rotatable head into the different angular positions corresponding to the different contacts, the brush 102, Figs. 4 and 6, is provided with a spring pressed pawl or latch 106 adapted to snap into notches or recesses 107 formed at intervals about the inner periphery of the ring 90. The rotatable member 74, Figs. 3 and 4, is also provided with a similar series of peripheral notches 109 into which may snap a spring pressed pawl 108 which is mounted for sliding movement in guide lugs 110 placed in a recess in the insulation 92. The pawl and its supporting lugs, Figs. 6, are insulated from the contact springs 14 by a fiber ring or other insulation 94 underlying the lower ring 91 and the guide lugs of the pawl.

All of the contact springs 16 are secured to the upper surface of the base 68, Fig. 5, by lugs 112 and screws 114, the latter passing through the base and being connected together by links 116. One of the end lugs 112 Fig. 5, is connected by a link 118 with a nut 120, Fig. 3, threaded on the lower end of the bushing 84. Through these connections, electric connection is or may be established between the rotatable member 74 and wires 122 which are secured to the nut and lead to the alarm or signal, For the purpose of readily changing the combination, the wires 103 may be connected to any one of the screws 114 and the links 116 adjacent to the latter removed and reinserted between the screw 104 and the adjacent screws 114.

In operation, an authorized person rotates the member 44 by means of the push buttons until the index line 62 is opposite the proper symbol on the dial 64 to bring the switch member or spindle 12 over the contact spring 14. The other member 74 is also rotated by aid of the knob 80 until the registration of the index line 62 with the proper symbol on the dial 82 indicates that the insulated opening 76 is directly over the contact spring 14. The switch member or spindle 12 is then depressed by the push button 40 through the opening 76 against the contact spring 14 to establish electrical connection between the battery and the ignition system. This connection is completed by way of wires 98, binding screw 96, ring 90, brush 102, bushing 49, bracket 48, spindle 12, spring 14 and wires 103. If an unauthorized person depresses the spindle, he will ordinarily press it against the bottom of the cup shaped member 74 and thus establish connection between the battery and the alarm signal. This connection is completed by way of wires 98, screw 96, ring 90, brush 102, bushing 49, bracket 48, spindle 12, members 74 and 84, nut 120 and wires 122. In the unlikely event that the unauthorized person registers the spindle with the insulated opening 74, both are more likely to be disposed over some one of the contact springs 16, rather than over the correct contact spring 14. The spindle will then establish communication between the battery and alarm through one of the contact springs 16, the lugs 112, links 116, link 118, nut 120 and wires 122. As hereinbefore stated, this alarm contact, once established, cannot be interrupted unless the combination is known.

The relay coils 22 and 32 may be mounted in any convenient position on the instrument board or elsewhere or within a suitable enlargement of the switch casing. The wires leading from the switch housing are preferably encased in an armored cable to prevent disturbance. By the term ignition circuit, we intend to cover any circuit in which such an apparatus is or may be used in an equivalent manner, this term being used merely for convenience. Although the invention has been described as particularly intended for use on automobiles to prevent theft and has been detailed in connection with an illustrated construction, it should be understood that it is not to be limited in any respect to the exact construction shown and described except as it may be restricted in scope by the prior art.

We claim:

1. In a device of the class described, in combination, a rotatable head, a switch member comprising a spindle slidably carried by the head at one side of its axis and rotatable with the head, a contact member, means for rotating the head and sliding the switch member to bring the latter into engagement with the contact member, and a concealed member interposed normally in the path of movement of the switch member to prevent said engagement.

2. In a device of the class described, in combination, a contact member, a plate having an opening so located as to be brought into registration with the contact member, a rotatable head, a switch member slidable thereon and connected to a source of current, and means for separately and independently rotating the head and the plate to cause registration of the switch member and said opening with the contact member.

3. In a device of the class described, in combination, a slidable switch member, a single contact member, a plurality of contact members adapted to be connected to a signal, a plate normally interposed between the switch member and the single contact member, means for moving the plate to allow contact of the switch member with the single contact member, and means for moving the switch member to cause said contact.

4. In a device of the class described, in combination, a switch member, a single concealed contact member, a plurality of concealed contact members adapted to be connected to an alarm circuit, a dial for locating the switch member for engagement with the single contact member, links connecting the plurality of contact members, said links being interchangeable to release one of said plurality of contact members from the alarm circuit and to connect said single contact member with the alarm circuit, and means for arranging the released member for connection with a source of current to change the combination.

5. In a device of the class described, in combination, a movable head, a switch member slidably mounted in the head at one side of the axis of the head, and connected with a source of current, a contact member, means for moving the head to register the switch member with the contact member, and a plate normally interposed between the switch member and the contact member and adapted to be connected to an alarm circuit.

6. In an unauthorized use preventer for use in an ignition system, a movable head, a contact member, a switch member movable with the head and continually connected with a source of current, said switch member also being movable with respect to the head to establish connection with the contact member, a conductor normally interposed in the path of the switch member, and interposed in an alarm circuit, and means for moving the head to carry the switch member to a position where it can pass the conductor to engage the contact members without completing the alarm circuit.

7. In a theft preventer, a contact member, a switch member connected with a source of current and having an end movable into contact with the contact member to connect it with the source of current, an apertured conductor normally extending across the end of the switch to obstruct its passage, means for rotating the conductor to register its aperture with the switch to allow the latter to engage the contact member, and separate means for moving the switch member to a position in alignment with said contact member.

8. In a device of the class described, in combination, a rotatable head, a switch member carried by the head and continuously connected with a source of current, a plurality of contact members spaced around the axis of the head and with which the switch member can engage to complete an alarm circuit, a single contact member with which the switch member can engage to connect said single contact member with the source of current, and means for operating the switch member.

9. In a device of the class described, in combination, a rotatable head, a slidable switch member carried by the rotatable head at one side of the axis of the head, a plurality of contact members with which the switch member can be engaged to complete an alarm circuit, a single contact member with which the switch can engage, and means for rotating the head and sliding the switch to complete one of the circuits.

10. In an unauthorized use preventer for automobiles, a rotatable head, a contact member, a switch carried by the rotatable head and slidable towards the contact member, a rotatable plate normally interposed in the path of movement of the switch and having an opening to allow passage of the switch to engage the contact member, means for rotating the plate to bring the opening into registry with the contact member, separate means for rotating the head to bring the switch into registry with the contact member, and means for indicating the positions of the head and the plate.

11. In an unauthorized use preventer for automobiles, a movable head, a contact member, a switch carried by the movable head and adapted to engage the contact member, a movable plate adapted to be connected to an alarm circuit and normally interposed in the path of movement of the switch, said plate being insulated from the movable head and from the contact member, means for moving the plate to allow the switch to pass it, and means for moving the switch into engagement with the contact member.

In testimony whereof we have signed our names to this specification.

ALFRED C. GALDI.
ARMAND GALDI.